June 10, 1930.          R. S. SANFORD          1,762,699
BRAKE OPERATING MEANS

Filed Nov. 12, 1926

INVENTOR
ROY S. SANFORD
BY
ATTORNEY

Patented June 10, 1930

1,762,699

UNITED STATES PATENT OFFICE

ROY S. SANFORD, OF SOUTH BEND, INDIANA, ASSIGNOR TO BENDIX BRAKE COMPANY, OF CHICAGO, ILLINOIS, A CORPORATION OF ILLINOIS

BRAKE-OPERATING MEANS

Application filed November 12, 1926. Serial No. 147,855.

This invention relates to operating means for trailer brakes and has for an important object the provision of a safety device which will automatically apply the trailer brakes in case of accidental separation of the trailer from the tractor which is drawing it, as for example when the trailer coupling is broken. This automatically brings the trailer to rest in case of such an accident and prevents it from running wild and doing possible damage.

I preferably provide the operating means for the trailer brakes with a safety device which is inoperative as long as the trailer is connected to the tractor but which is operated automatically by the tractor in case the trailer breaks away in such a manner as to apply the trailer brakes. In one desirable arrangement, means such as a pawl and ratchet is provided for holding the trailer brakes applied after the safety device has been operated as described.

In the arrangement illustrated in the drawing, the safety device is in the form of a tension element connected to the trailer brakes and to the tractor so that, in case the trailer breaks away from the tractor, the tension element will be extended by the separation of the two vehicles to apply the brakes which are then held by the pawl and ratchet or its equivalent, as of course the tension element is broken almost immediately after the brakes are applied. I consider it desirable that the safety connection should include between the pawl and ratchet and the tractor a part which is the weakest element of the combination, to insure that the breakage will take place without rendering the pawl and ratchet ineffective, this being illustrated as a shear pin connecting the tension element proper to a hook or the like adapted to be secured to the tractor. The use of a device such as a hook also permits the tractor to be detached from the trailer when desired without operating the brakes.

The above and other objects and features of the invention, including various combinations of parts and desirable particular constructions, will be apparent from the following description of one illustrative embodiment shown in the accompanying drawing, in which.

Figure 1:
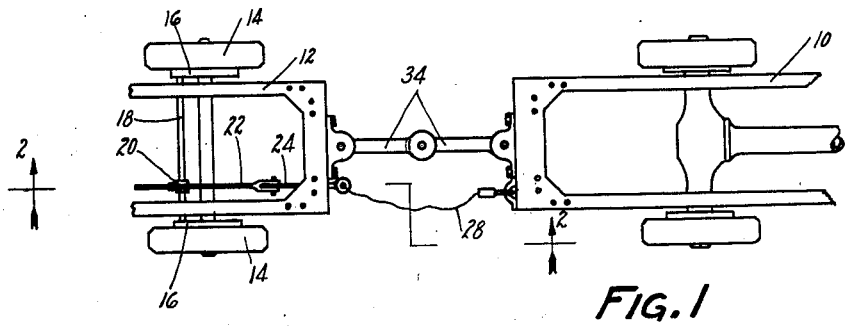
Figure 1 is a top plan view of the rear portion of a tractor and the front portion of a trailer connected to the tractor and showing the safety connection for the trailer brakes.
Figure 2:
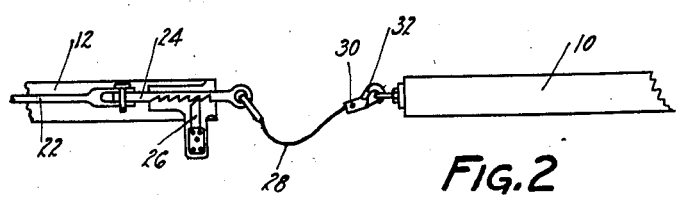
Figure 2 is a partial section on the line 2—2 of Figure 1 showing the pawl and ratchet.
Figure 3:
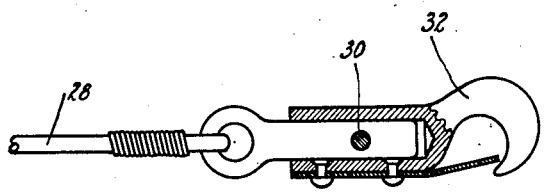
Figure 3 is a view on an enlarged scale showing the connection of the above-described hook to the tension element by means of a shear pin.

In the drawings, 10 indicates any suitable tractor, such as a motor truck or the like, and 12 indicates a trailer having road wheels 14 provided with brakes 16 operated by means such as a shaft 18 having an arm 20 rocked to apply the brakes by a link 22. The link 22 is pivotally connected at its front end to the rear end of a plunger 24 formed with a ratchet as shown in Figure 2, and associated with a spring-pressed pawl 26 which permits the plunger 24 to be moved forwardly in a direction to apply the brakes 16 but which does not permit movement in the opposite direction to release the brakes unless disengaged manually.

The plunger 24 is operated by a safety device such as a tension element 28 connected at its front end by a shear pin 30 to a fastening such as a hook 32 arranged to be detachably secured to the rear end of the tractor 10. The tractor 10 and the trailer 12 are connected by the usual trailer or draft connection 34 and the safety brake connection 28 is enough longer than the connection 34 so that it has no effect on the brakes in turning corners or at any time except when the draft connection 34 is broken and the trailer 12 is unintentionally disconnected from the tractor 10. When this happens, the brake connection 28 is straightened out and the brakes 16 are automatically applied and held applied by the pawl 26, while the shear pin 30 gives way to permit the breakage of the safety connection without undue damage. The arrangement of the shear pin 30 between the tractor and the pawl 26 also insures that the breakage will take place at such a point that there is no danger but that the brakes 16 will be held applied by the pawl 26 or its equivalent.

While one illustrative embodiment of the invention has been described in detail, it is not my intention to limit its scope to that particular embodiment or otherwise than by the terms of the appended claims.

I claim:

1. In combination with a tractor and a trailer having brakes and having a draft connection with the tractor, a brake-applying device on the trailer, a brake connection from the tractor to said device which extends substantially parallel to the draft connection and which is inoperative as long as the trailer is connected to the tractor by the draft connection and which is tensioned to operate said brake-applying device by separation of the trailer and the tractor greater than permitted by the draft connection, mechanism for holding said brakes applied following the break of the brake connection, said brake connection having its weakest part disposed between said mechanism and the tractor, said part including a transversely extending yieldable member.

2. In combination with a tractor and a trailer having brakes and having a draft connection with the tractor, a brake-applying device on the trailer, a brake connection from the tractor to said device which is inoperative as long as the trailer is connected to the tractor by the draft connection and which is tensioned to operate said brake-applying device by separation of the trailer and the tractor greater than permitted by the draft connection, and means for holding the brakes applied through said device when the brake connection is broken after being so tensioned, the brake connection including as its weakest element a shear pin between said means and the tractor.

3. In combination with a tractor and a trailer having brakes and having a draft connection with the tractor, a brake-applying device on the trailer, a brake connection from the tractor to said device which is inoperative as long as the trailer is connected to the tractor by the draft connection and which is tensioned to operate said brake-applying device by separation of the trailer and the tractor greater than permitted by the draft connection, and means for holding the brakes applied through said device when the brake connection is broken after being so tensioned, the brake connection including a tension element and a fastening for detachably engaging the tractor and secured to said element by means forming the weakest part of the brake connection.

4. In combination with a tractor and a trailer having brakes and having a draft connection with the tractor, a brake-applying device on the trailer, a brake connection from the tractor to said device which is inoperative as long as the trailer is connected to the tractor by the draft connection and which is tensioned to operate said brake-applying device by separation of the trailer and the tractor greater than permitted by the draft connection, and means for holding the brakes applied through said device when the brake connection is broken after being so tensioned, the brake connection including a tension element and a fastening for detachably engaging the tractor and secured to said element by a shear pin forming the weakest part of the brake connection.

5. In combination with a tractor and a trailer having brakes and having a draft connection with the tractor, a brake-applying device on the trailer, a brake connection from the tractor to said device which is inoperative as long as the trailer is connected to the tractor by the draft connection and which is tensioned to operate said brake-applying device by separation of the trailer and the tractor greater than permitted by the draft connection, and means for holding the brakes applied through said device when the brake connection is broken after being so tensioned, the brake connection including a tension element and a hook engaging the tractor and secured to said element by a shear pin.

In testimony whereof, I have hereunto signed my name.

ROY S. SANFORD.